Nov. 24, 1964    D. H. YOUNG ET AL    3,158,314
INFLATING DEVICES FOR INFLATABLE OBJECTS
Filed Feb. 21, 1962    2 Sheets-Sheet 1
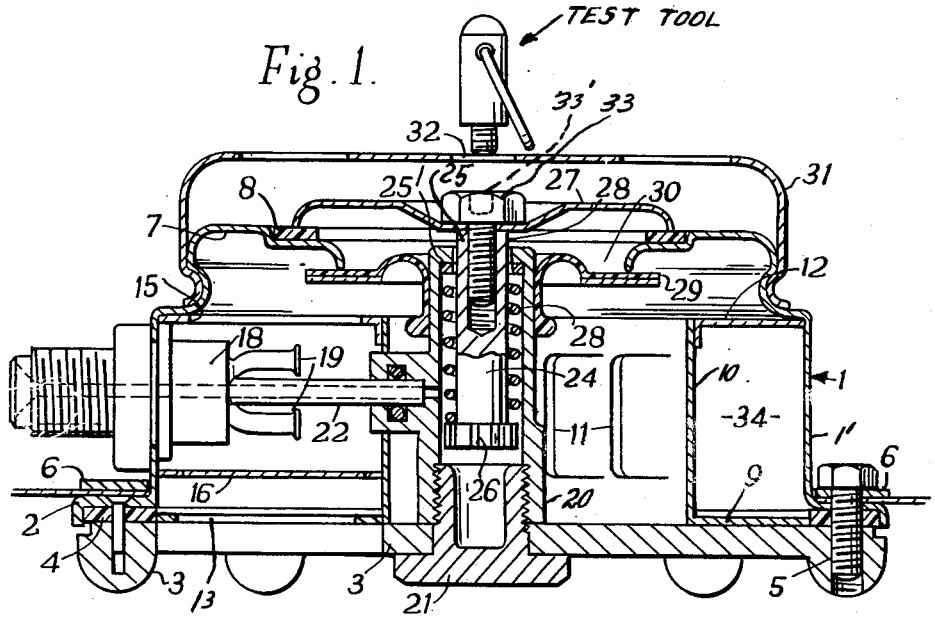
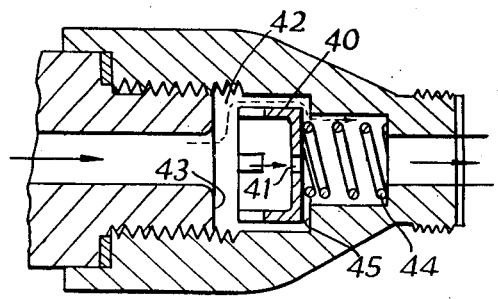
INVENTORS
DAVID H. YOUNG
JOHN O. MARSH
DERRICK M. POHLER
BY
J. William Carson
ATTORNEY

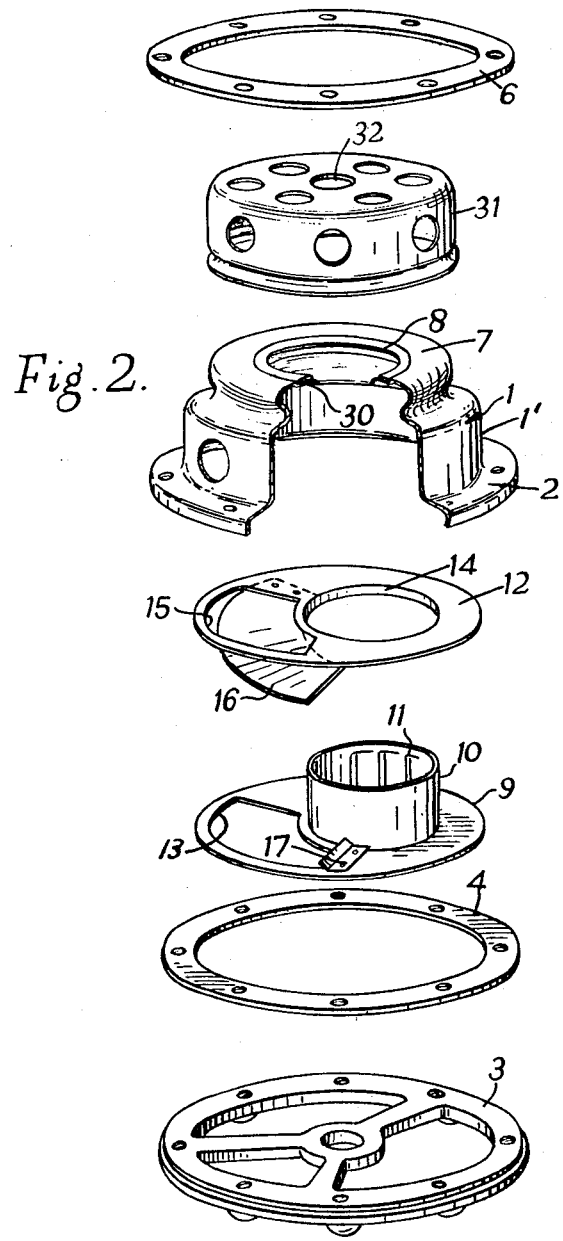

United States Patent Office

3,158,314
Patented Nov. 24, 1964

3,158,314
INFLATING DEVICES FOR INFLATABLE OBJECTS
David H. Young, Eastcote, Middlesex, John O. Marsh, Chalfont St. Peter, and Derrick M. Pohler, Harrow, Middlesex, England, assignors to Specialties Development Corporation, Belleville, N.J., a corporation of New Jersey
Filed Feb. 21, 1962, Ser. No. 174,900
6 Claims. (Cl. 230—95)

The present invention relates to aspirator devices intended for installation in inflation bags, such as inflatable dinghies.

It is well-known to employ such devices in conjunction with inflation by means of the release of a compressed gas from a storage container. By the use of an aspirator device, the energy of the stored compressed gas can be utilised to aspirate a volume of air several times greater than the volume of the stored gas in its expanded condition into a low pressure inflation bag, such as an inflatable dinghy.

A number of different forms of aspirator device have already been tried with varying degrees of success. One particular drawback with known types of aspirator device is that if they are to provide efficient entrainment of air they must be rather long to provide a desirable long venturi passage. The result of this is to make it rather difficult to stow a dinghy, for example, fitted with such an aspirator device. Furthermore, a long, thin aspirator device itself is relatively fragile if its weight is kept low, as is required for aircraft use.

The present invention is based on an appreciation that an aspirator device of generally circular construction and whose axial length is low as compared with its diameter can be produced with a long venturi passage and could be made much more robust and light in weight, than known types, and could at the same time be more compact than known devices having a comparable efficiency of aspiration, thus overcoming some of the objections with regard to the dimensions and fragility which arises with existing high efficiency aspirators.

Basically, the aspirator device of the present invention depends upon setting up a rapid stream of gas in a rotary or helical direction between an inner and an outer cylindrical body. If this is achieved, gas can be entrained not only from the passage end, away from which the stream of gas is directed, but also through inlets, such as louvres in particular, formed in the wall of the inner cylindrical member.

According to the present invention, there is provided an aspirator device for installation in inflation bags, such as inflatable dinghies and life rafts, comprising a rounded outer body, a rounded inner body arranged within the outer body, so as to define a curved path between the inner and outer bodies extending obliquely to the length of the bodies, one or more nozzles placed in the space between the inner and outer bodies and arranged to direct a stream of gas along the curved path, air inlet means at one end of the curved path, outlet means at the other end of the curved path and sealing means for shutting off the passage of air through the device.

According to a further aspect of the present invention an aspirator device for installation in inflation bags, such as inflatable dinghies and life rafts, comprises a rounded outer body, a rounded inner body arranged within the outer body, diffuser inlets arranged in the side wall of the inner body, means permitting the entry of atmospheric air into the interior of the inner body from the outer end thereof, one or more nozzles placed in the space between the inner and outer bodies and arranged to direct a stream of gas in a direction generally tangential to the wall of the outer body so as to set up a swirling stream of gas in such space, means for directing air and gas to travel towards the inner end of the device and sealing valve means for shutting off the passage of air through the device.

Air and gas are preferably caused to travel in a substantial helical path in the passage between the outer body and the inner body by providing end plates over the outer and inner ends of the passage, in which port apertures are formed, and arranging a part-helical baffle to direct the stream of air and gas to the outlet port aperture in the inner end plate.

The sealing valve preferably is or includes a valve of the positive type, i.e. one which does not depend on gas pressure for maintenance in a closed condition. It is preferably placed at the inlet end, upstream of the nozzles, so as to shut off both the inlet end of the inner body and the inlet end of the passage space between the inner and outer bodies from atmosphere. These bodies are preferably arranged eccentrically in relation to each other, so that there is in effect a throat between them to act as a venturi, the inlet aperture in the outer cover plate being positioned in such event over a relatively wide portion of the space between the two bodies and the diffuser apertures at a position downstream of the throat.

One form of apparatus is hereinafter described with reference to the accompanying drawings, wherein:
FIGURE 1 is a section of the device.
FIGURE 2 is an exploded perspective view of the body of the device without the valves.
FIGURE 3 is a section of an associated flow control device.

The apparatus shown in the drawings comprises a main casing 1 preferably formed as a metal spinning which has a cylindrical or rounded body or wall portion 1'. At one end this main casing is provided with an outwardly turned flange 2, which is provided with apertures at intervals to permit it to be bolted or riveted to a base plate 3 through a gasket 4. The material of the dinghy or other inflation bag is clamped to the flange 2, by means of bolts 5, which engage a metal ring 6 (FIGURE 1). The base plate 3 itself is in the form of a circular disc having apertures in it to permit the passage of gas. At its outer end the main casing 1 is turned inwardly and provided with an inwardly turned terminal lip 7, which acts as a support for a valve seating washer 8 surrounding a relatively large axial entry to the main casing.

Supported within the main casing and upon the base plate is a lower vortex former 9 which comprises an apertured disc having a cylindrical or rounded body or wall portion 10 secured eccentrically to it and eccentrically disposed with respect to the body 1'. This lower vortex former 9 has louvres 11 around part of the periphery of its cylindrical portion, and when such cylindrical portion is inserted into the main casing, it will be appreciated that the cylindrical portion 10 is eccentric. The lower vortex former has a partly annular piece pressed out of it to form an inlet aperture 13.

An upper vortex former 12 consists of a flat disc with an eccentric aperture 14 therein adapted to fit over the cylindrical portion 10 of the lower vortex former 9. The upper vortex former has a partly annular piece pessed out of it to form an inlet aperture 15 positioned above the aperture 13 and below which a helical baffle 16 is secured. The lower free end of this baffle rests upon a correspondingly inclined member 17, secured to the lower vortex former 9. A nozzle block 18 is secured in the side of the main casing 1 at a position over the helical baffle 16 and is adapted to draw gas from a pressure source. The nozzle block has nozzles 19 which are arranged to direct gas substantially along the face of the baffle 16.

An enclosed cylinder 20 is clamped to the base plate 3 for support thereon by a screw 21 and is mounted axially of the device. The cylinder 20 has a connection 22 to the nozzle block 18 so that during inflation gas at supply pressure is admitted to the cylinder 20. A piston 24 mounted in the cylinder 20 has a stem 25 which projects through a gland 25' in the top end of the cylinder and has a fluted head 26, which is guided in the cylinder. The projecting end of the piston stem 25 carries a valve member 27, which is adapted to, and normally does, seat upon the rubber seating washer 8 bonded on the outer surface of the main casing 1. The piston head 26 is acted upon by a compression spring 28, which presses the valve member 27 upon its seating washer, but the spring force is overcome on admission of gas under pressure to the cylinder 20 so as to unseat the valve member 27. The spring loaded valve may be supplemented by an annular flap valve 29 which is supported on the exterior of the cylinder 20 and is adapted to be pressed upwardly against a seat lip 30 at the mouth of the aperture in the top of the casing when the gas pressure in the body exceeds atmospheric pressure. The flap valve 29 is, however, an optional feature.

An apertured guard member 31 is positioned over the top of the movable valve member 27 and is provided with an axial aperture 32 to permit a test tool to be screwed into a bolt 33 having a threaded axial hole 33' in it, the bolt 33 being secured in the top end of the projecting part of the piston 24 to secure the value member 27 thereto. This permits the piston to be tested for freedom in its cylinder.

In operation, when gas is admitted under pressure to the nozzles 19 the spring loaded valve 27 is simultaneously lifted. The stream of gas emitted from the nozzles 19 is given a downwardly inclined direction by means of the helical baffle 16 and the general directing of the nozzles, and this causes a sufficient reduction of pressure in the upper part of the casing 1 above the vortex former 12 to induce air into it past the annular flap valve 29 (if used). The induced air is then free to enter either the space between the outer wall of the main casing 1 and the cylindrical part 10 of the lower vortex former 9 through the aperture 15 in the upper vortex former 12 or to enter the interior of the cylindrical part 10 of the lower vortex former 9 through its open upper end.

Gas from the nozzles 19 can thus entrain atmospheric air from two different directions, and a venturi effect is produced by the eccentricity of the cylindrical part 10 of the lower vortex former 9, which produces a throat at 34. The louvres 11 formed in the lower vortex former 9 are so positioned that they open into the gas path only at positions swept by the stream of gas as it expands after passing the throat 34 formed at the position where the wall of the cylindrical portion 10 and the main casing 1 approach each other most closely.

When the gas pressure of the gas supply drops to a point where it is no longer able to maintain the spring loaded valve member 27 in the open condition, the valve closes and the remaining gas in the storage cylinders is available for inflating the inflation bag to a pressure slightly in excess of atmospheric pressure.

It will thus be seen that the present invention permits the construction of an aspirator device of compact and light construction, in which there is an extended gas path, as is necessary for efficient aspiration.

It is found that for most efficient entrainment of air it is desirable that the gas inlet pressure should be limited to about 300 p.s.i. In order to achieve this result a simple form of flow controller, shown in FIGURE 3, is placed upstream of the inlet to the nozzle block 18. This device conveniently consists of a slotted piston 40, having an axial aperture 41 through it and located in a bore 42. The piston under no flow conditions is pressed against a shoulder 43 by a spring 44 which urges the piston away from a seating 45. When gas under high pressure is admitted, the piston 40 is pressed against its seating 45 and the flow takes place only through its axial aperture 41. As the gas pressure drops, the piston 40 is pressed away from its seating 45 by the spring 44, so that the resistance to flow is decreased.

In an alternative construction of the device, the attachment of the device to the fabric of the inflation bag is at a position near to the outer axial end of the device, as opposed to being near to the end, as in the example illustrated in FIGURES 1 and 2. The outlet aperture leading into the inflation bag may then be formed in the side wall of the casing 1 downstream of the louvre apertures.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. An aspirator device for installation in inflation bags such as inflatable dinghies and life rafts, comprising a rounded outer body, a rounded inner body eccentrically arranged within said outer body to define an annular space between said bodies, a first member at one end of said bodies and a second member at the other end of said bodies enclosing said annular space, an air inlet opening in said first member, an air outlet opening in said second member substantially adjacent said inlet opening, a baffle positioned in said annular space between said inlet and said outlet for directing air flow from said inlet into a curved path extending obliquely to the length of the bodies around said annular space to said outlet, gas nozzle means placed in the path between said inner and outer bodies and arranged to direct a stream of gas along said curved path, and valve means at said air inlet means for shutting off the passage of air through the device.

2. An aspirator according to claim 1, wherein diffuser inlets are arranged in the side wall of the inner body and means are provided for the admission of atmospheric air to the interior of the inner body whereby to draw air into the curved path through the side wall of the inner body.

3. An aspirator, comprising an outer circular body, an inner circular body arranged eccentrically within said outer circular body to define an annular space between said bodies, inner and outer end cover means at the ends of said circular bodies, inlet means in the outer end cover, outlet means in the inner end cover, said inlet and outlet means communicating with the annular space between said inner circular body and said outer circular body, an inclined baffle plate positioned in said annular space between said inlet and said outlet for directing air flow from said inlet into a curved path extending obliquely to the length of the bodies around said annular space to said outlet, gas nozzles arranged over said baffle and arranged to direct a gas stream therealong in an inward direction, louvre apertures in the side wall of the inner circular body at a position downstream of a throat formed between the eccentrically arranged inner circular body and the outer circular body, inlet means leading into the outer end of said inner circular body and valve means adapted to seal off the inlet means both in the end cover and in the inner circular body.

4. An aspirator device according to claim 3, wherein the outer circular body further includes an outer member overlying and spaced from the outer end cover, said outer member having an aperture means therein adapted to be rendered ineffective by said valve means.

5. An aspirator device according to claim 3, including a closed cylinder placed in said device co-axially with said inlet means of said outer circular body, a piston member in said cylinder connected with a movable valve member of said valve means, a spring means acting on said piston member to draw said valve member against a seating on said outer end cover, and a gas inlet to said cylinder for the admission thereto of gas under pressure, said gas acting on the piston in opposition to said spring force.

6. An aspirator device according to claim 5, further including an annular flap valve member supported on said cylinder and arranged to seal against a seating on the inner surface of said outer end cover.

References Cited in the file of this patent

UNITED STATES PATENTS 2,595,218   Allen _____ May 6, 1952